Dec. 24, 1929.                J. N. CURLEE                1,741,099
                             UNIVERSAL JOINT
                           Filed Dec. 26, 1928

Jasper Newton Curlee
INVENTOR

BY Victor J. Evans
ATTORNEY

Patented Dec. 24, 1929

1,741,099

UNITED STATES PATENT OFFICE

JASPER NEWTON CURLEE, OF LITTLE ROCK, ARKANSAS, ASSIGNOR OF ONE-HALF TO HARRY SCHER, OF LITTLE ROCK, ARKANSAS

UNIVERSAL JOINT

Application filed December 26, 1928. Serial No. 328,391.

This invention relates to a universal joint, the general object of the invention being to provide a joint which will automatically take up wear and one which is composed of but a few parts so that it can be manufactured to sell at low cost.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1:
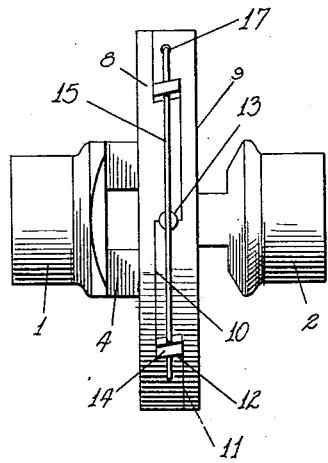
Figure 2:
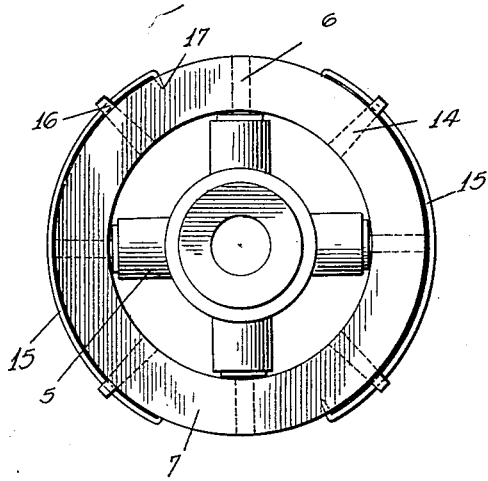
Figure 7:
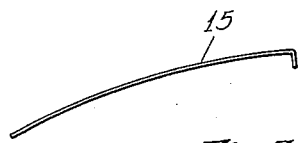
Figure 8:
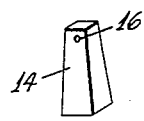
Figure 3:
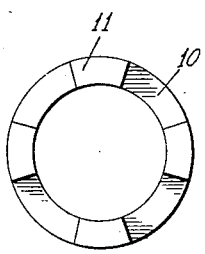
Figure 4:
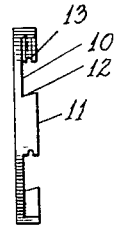
Figure 5:
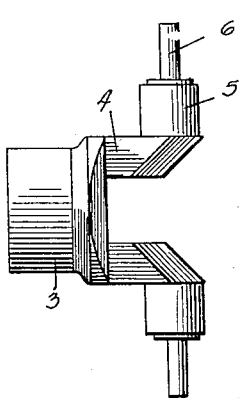
Figure 6:
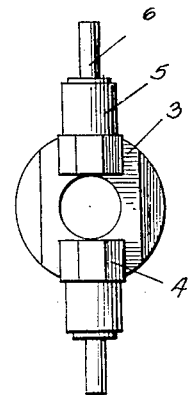

Figure 1 is a side view of the invention.
Figure 2 is a front view thereof.
Figure 3 is an inner face view of one of the sections of the ring member.
Figure 4 is an edge view of said section.
Figure 5 is a view of one of the shaft connections.
Figure 6 is an end view of such connection.
Figure 7 is a view of one of the springs.
Figure 8 is a view of one of the wedges.

In these views, the numeral 1 indicates the drive shaft connection and the numeral 2 the driven shaft connection. Each connection comprises a body part 3, the prongs 4 and the rightangle extensions 5 on the prongs, each extension being formed with a reduced end which provides a pintle 6. The ring member 7, which forms the bearing member for the pintles and acts to connect the members 1 and 2 together, is formed of two sections 8 and 9, each section having its inner face formed with a number of recesses 10 which provide the projections 11, the recesses and projections being so formed that the projections on one section will enter the recesses of the other section, with the inner faces of the sections contacting each other. Each recess is formed with an undercut wall 12 and with a straight wall having a semi-circular recess 13 therein. The recesses 13 in one section will come opposite similar recesses in the other section so as to form circular bearing openings for the pintles 6 of the members 1 and 2. The undercut walls 12 of the two sections will also come opposite each section when the sections are placed together so as to form wedge-shaped openings for receiving the wedge blocks 14. Thus the pintles and the wedge blocks lock the two sections of the ring member together.

A pair of springs 15 is arranged one opposite the other on the exterior circumference of the ring member, these springs passing through holes 16 formed in the small and outer ends of the wedge blocks, with one end of each spring bent inwardly and engaging a hole 17 formed in the ring member. These springs not only act to hold the wedge blocks in place, but they also tend to move the wedge blocks outwardly and thus the wedge blocks will move one section in relation to the other to take up wear between the bearing openings formed by the recesses 13 in the ring member and the pintles 6.

Thus I have provided a universal joint which automatically takes up its own wear, thereby remaining in good condition regardless of use. In taking up its own wear, looseness in the joint and consequent looseness of others parts of the machinery affected thereby is rendered impossible.

A loose universal joint destroys the machinery with which it is connected, shortening its life by causing it to knock and wear through vibration and the slack or looseness in the joint itself. There is no way to repair a worn universal joint. It is possible to replace one. In my invention, a very great feature is that it will last throughout the life of an automobile, remaining as tight as when first put into use. It will also last as long in any other machinery.

This universal may be taken completely apart and reassembled in less than one minute, without the use of any tools. It is not put together with bolts or screws or rivets, each part fitting together snugly as the result of the two springs connected thereto.

The device may be made to be used in any machinery utilizing a universal joint, or in which such joint is desired.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A universal joint comprising a pair of shaft connections, a ring member formed of two sections, each section having recesses therein which form bearing openings when the sections are placed together for receiving the pintles of the shaft connections and means for automatically moving the ring sections relative to each other to take up wear between the bearing openings and the pintles.

2. A universal joint comprising a pair of shaft connections, a ring member formed of two sections, each section having recesses in its inner face which form projections on the inner face, the recesses of one section receiving the projections of the other section, some of the walls of the recesses having small recesses therein for forming bearing openings for the pintles of the shaft connections when the sections are placed together, the other walls of the recesses being undercut to form wedge-shaped openings when the sections are placed together, wedge blocks placed in the openings and springs passing through the small ends of the wedge blocks and tending to move them outwardly whereby the sections are moved relative to each other by the wedge blocks so as to take up wear between the bearing openings and the pintles.

In testimony whereof I affix my signature.

JASPER NEWTON CURLEE.